Sept. 7, 1926.

J. M. VOGEL

COLOR METER

Filed March 18, 1925

1,598,899

Patented Sept. 7, 1926.

1,598,899

UNITED STATES PATENT OFFICE.

JOSEPH M. VOGEL, OF SAN FRANCISCO, CALIFORNIA, ASSIGNOR OF ONE-HALF TO CARL S. PLAUT, OF OAKLAND, CALIFORNIA.

COLOR METER.

Application filed March 18, 1925. Serial No. 16,413.

This invention relates to a color meter for measuring or determining the chroma and value of a color.

The invention consists of a system of color charts displaying the primary colors, shades, grays and tints thereof, each square of the chart being separately colored with a mixed pigment, the mixture being different for each one of the one hundred squares shown, the object of the invention being to provide a simple color chart system whereby the shades, grays or tints of any color may be readily determined; and furthermore, to provide a system or nomenclature whereby the color, shade, gray or tint thereof may be expressed numerically so that a particular color, shade or tint required may be readily transmitted orally or in writing to another person without exhibiting a sample thereof.

One form which the color system may assume is illustrated in the accompanying drawings, in which—

The color chart system forming the subject matter of the present application is based on the theory that there are thirty-six primary colors of a purity or intensity of one hundred percent, and if it is desired to obtain a pure or harmonious shade, gray or tint thereof, it can only be obtained by mixing two complementary or opposite primaries and white.

To clearly explain the system, reference will first be made to Fig. 1. By referring to this figure, it will be noted that thirty-six primary colors are displayed in circular formation and that these colors are numbered from 1 to 36 respectively. There are four varieties of yellow and similarly four varieties of each of the following colors, to-wit, orange, red, purple, violet, blue, cyan, turquoise and green. It will also be noted that a center spot of black is illustrated, this being displayed for the reason that all direct opposite primary colors when mixed until neutralized will form black. For instance, 1 and 18, which are yellow and violet respectively, when mixed until neutralized, produce black, the same result being obtained when any of the other direct opposite primaries are mixed to neutrality.

According to this system the thirty-six colors are of one hundred percent intensity and purity and they are arranged 10° apart on the color circle. It might further be stated that each primary color according to this system is so intense that the color sensations represented by the refraction of the spectrum are found wanting in chroma and only colors of one hundred percent chromatic tinting strength are used to represent the primaries. Each primary color when mixed with an opposite or complementary color produces shades of the primary colors and neutral black, depending upon the proportion of the mixtures.

The above admixtures mixed with white in varying proportions produce complete gradations of tints and grays. Tints, in other words, are produced by mixing a primary color with a white. Shades are produced by mixing two opposite primaries, and grays are produced by mixing two opposite primaries and whites. Tints and grays may also be produced of varying intensity by adding more or less white.

Figure 1:
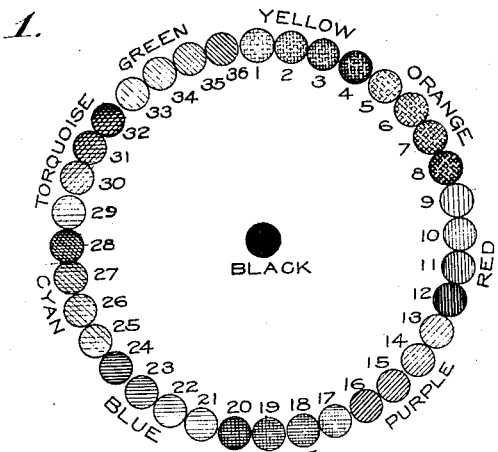
Fig. 1 is a diagrammatic view illustrating the color chart upon which the primary colors are displayed.

By referring to the primary color circle shown in Fig. 1, it will be noted that yellow (1) forms the lightest of the primary colors and is disposed at the top center of the color circle. Further, that 18, which is violet and the darkest color in the circle, is disposed at the bottom thereof and directly opposite the lightest yellow. This combination forms the center central axis of the color circle and represents the lightest and darkest colors. 9, representing red, is disposed on the horizontal axis of the circle, while 27, representing turquoise, is directly opposite same.

The right hand side of the circle is known as the warm color side, while the left hand side of the circle is known as the cold color side.

Figure 2:
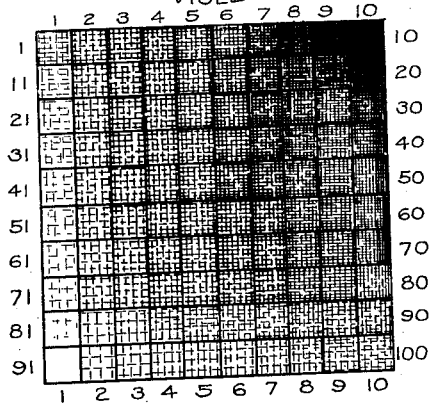
Fig. 2 is a diagrammatic view illustrating a color chart which displays one primary color, together with the shades, grays and tints thereof, the color displayed in that instance being yellow.
Figure 3:
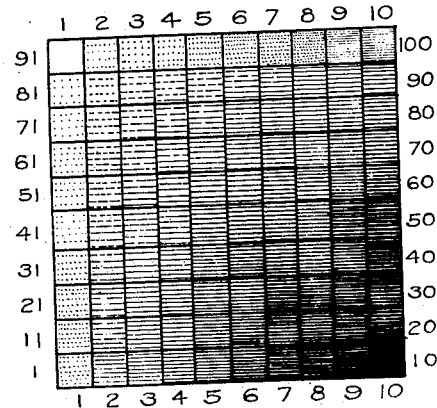
Fig. 3 is a view similar to Fig. 2 displaying the primary color violet, together with the shades, grays and tints thereof.

For the purpose of being able to display the various shades, grays and tints of each primary color, a series of charts, such as shown in Figs. 2 and 3, are employed. These charts are divided vertically and horizontally by ten equally spaced lines and each chart is thus divided into one hundred squares. These squares are numbered, as illustrated, from 1 to 100. The color square 100 represents the primary; for instance, in this case yellow. (See Fig. 2.) The second chart shown in Fig. 3 is similarly divided into one hundred squares, numbered as illustrated, and the two color charts are preferably placed on one sheet in alignment, as shown. The color square 100 on Fig. 3 represents violet 18, as this is the direct opposite primary of yellow. By mixing these two opposite primary colors and adding a certain proportion of white, a set of two hundred variations of two colors that can safely be combined and used as a correct color harmony is obtained. By adding white to the yellow primary shown at 100 in Fig. 2, a row of tints commencing at 100 and ending at 91 is obtained of the primary yellow, this row being displayed horizontally. By adding certain proportions of the direct opposite primary or violet, shades of the yellow primary are obtained and are displayed in the vertical row commencing at 100 and ending at 10.

To produce tints and grays of any of the shades shown in the vertical row 100 to 10, it is only necessary to add certain proportions of white, the darkest shades and black will thus be displayed in the upper right hand corner, the lightest tints and grays will be displayed on the left hand side, and the primary in the lower left hand corner.

What has been said of the yellow primary is true of the violet primary. Shades of the violet primary are obtained by mixing therewith a certain proportion of the yellow primary. The vertical row commencing at 100 in Fig. 3 and ending at 10 will hence display the darkest shades of the primary violet.

By adding white to the primary violet, the tints thereof are obtained and are displayed in the horizontal line commencing at 100 and ending at 91, the tints of the shades being also displayed on the horizontal lines shown from 90 to 10 inclusive, the shades and tints closest to the primary being displayed in the upper right hand corner, the darkest shades and black in the lower left hand corner, and the lightest tints and grays on the left hand side.

From the foregoing it can be seen that the color charts employed in the present system first of all consist of a single color chart, such as shown in Fig. 1, which displays the thirty-six primary colors. A second series of color charts are then employed, as shown in Figs. 1 and 2. These color charts display two opposite primaries, together with the shades, grays and tints thereof, and as they are each divided into one hundred squares, it can readily be seen that one hundred variations of each primary will be displayed. There will be eighteen color charts, such as shown in Figs. 1 and 2, displaying all of the opposite primaries, shades, grays and tints thereof, and thirty-six hundred distinct variations of color will thus be displayed on the several charts. The primary colors arranged in circular formation are ten degrees apart and the shades, grays and tints of each primary displayed on charts, such as shown in Figs. 2 and 3, are also ten degrees apart. The colors are thus displayed and arranged in a system which might be termed a metric system and for this reason lends itself to a nomenclature whereby any color, shade, gray or tint thereof may be denoted by numerals. For instance, if a purchaser should desire a primary yellow, he would merely ask for 1/100. If he should wish the lightest tint of yellow, he would ask for 1/91. If he should desire the darkest shade of yellow, which is pure black, he would ask for 1/10, etc. The first numeral indicates the primary color and the second numeral the shade, gray or tint thereof. Hence, it is possible to use a nomenclature in which colors are indicated by numerals and in which a particular color, shade, etc., may be readily transmitted orally or in writing to any person without exhibiting a sample thereof.

A system of this character may be employed by color-workers, advertising-men, interior decorators, painters, architects, artists and manufacturers, for expressing colors numerically and for determining color values.

Having thus described my invention, what I claim and desire to secure by Letters Patent is—

1. A system of displaying colors on charts which consists in dividing the chart into a plurality of sections, placing a pure color in one corner of the chart and varying said color horizontally in tints and vertically in shades of the selected color.

2. A system of displaying colors on charts which consists in dividing the chart into a plurality of adjacent sections arranged in a square, placing a primary color in one corner thereof, placing the tints of the color in horizontal alignment therewith, the shades of the color in perpendicular alignment, and the grays and darker shades of tints in parallelism with the first-named tints.

3. A system of displaying colors and a nomenclature therefor comprising a chart divided into a plurality of sections and said sections being arranged in a square, placing a primary color in one corner of the square and the shades, tints and grays thereof in the remaining sections of the square and in graduated order, and numbering the chart and the squares contained therein.

4. A system of displaying colors on charts which consists in lining the chart vertically and horizontally so as to produce a square consisting of one hundred sections, placing a primary color in one corner of the chart, placing the tints of the color in horizontal alignment therewith, the shades of the color in perpendicular alignment, and the grays and darker shades of tints in parallelism with the first-named tints, and arranging numerals along the hundred divisions of the square.

JOSEPH M. VOGEL.